(12) United States Patent
Evans et al.

(10) Patent No.: US 10,873,668 B1
(45) Date of Patent: Dec. 22, 2020

(54) DIRECT INWARD DIALING POOL LEASE FOR ORIGINATING AND TERMINATING SERVICES IN A UNIFIED COMMUNICATION PLATFORM

(71) Applicant: Fuze, Inc., Boston, MA (US)

(72) Inventors: Aaron Evans, Ottawa (CA); Luis Teixeira, Aveiro (PT); Andres Sanchez Pascual, Murcia (ES)

(73) Assignee: Fuze, Inc., Boston, MA (US)

( * ) Notice: Subject to any disclaimer, the term of this patent is extended or adjusted under 35 U.S.C. 154(b) by 0 days.

(21) Appl. No.: 16/919,784

(22) Filed: Jul. 2, 2020

Related U.S. Application Data

(62) Division of application No. 16/261,099, filed on Jan. 29, 2019, now Pat. No. 10,708,441.

(51) Int. Cl.
*H04M 7/00* (2006.01)
*H04M 3/42* (2006.01)
*H04M 15/00* (2006.01)
*H04M 11/06* (2006.01)

(52) U.S. Cl.
CPC ....... *H04M 7/009* (2013.01); *H04M 3/42042* (2013.01); *H04M 3/42059* (2013.01); *H04M 3/42331* (2013.01); *H04M 11/06* (2013.01); *H04M 15/755* (2013.01)

(58) Field of Classification Search
CPC combination set(s) only.
See application file for complete search history.

(56) References Cited

U.S. PATENT DOCUMENTS

| | | | |
|---|---|---|---|
| 5,862,211 A | 1/1999 | Roush | |
| 10,708,441 B1 | 7/2020 | Evans | |
| 2008/0186956 A1* | 8/2008 | Yeoum | H04L 65/1016 370/352 |
| 2009/0116634 A1* | 5/2009 | Levin | H04M 3/42263 379/221.01 |
| 2010/0111049 A1 | 5/2010 | Siegel | |
| 2012/0188892 A1* | 7/2012 | Demilie | H04M 3/42272 370/252 |
| 2014/0289037 A1* | 9/2014 | Wojcicki | G06Q 30/0267 705/14.45 |
| 2019/0182378 A1* | 6/2019 | Hou | H04M 3/42042 |
| 2019/0356617 A1* | 11/2019 | Synal | H04L 65/1066 |

* cited by examiner

*Primary Examiner* — Phung-Hoang J Nguyen
(74) *Attorney, Agent, or Firm* — McDermott Will & Emery LLP

(57) ABSTRACT

A method for originating and terminating services in a unified communication platform is provided. The method includes receiving, from a local market intermediate carrier, a request for a communication between a subscriber of a public network and an end-user endpoint in a local network, associated with an end-user phone number. The method includes creating a lease for an address anchor in a pool of addresses, receiving, in a proxy server from a carrier gateway server, a communication request from the end-user phone number to the address anchor, and establishing a communication channel to the address anchor. The method includes replacing, in the communication channel, a "from" header with a phone number of the subscriber of the public network, and a "to" header with the end-user phone number. A system and a non-transitory, computer-readable medium storing instructions to perform the above method are also provided.

18 Claims, 8 Drawing Sheets

DIRECT INWARD DIALING POOL LEASE FOR ORIGINATING AND TERMINATING SERVICES IN A UNIFIED COMMUNICATION PLATFORM

CROSS-REFERENCE TO RELATED APPLICATIONS

This application is a divisional of and claims the benefit under 35 U.S.C. § 121 of U.S. patent application Ser. No. 16/261,099 entitled "DIRECT INWARD DIALING POOL LEASE FOR ORIGINATING AND TERMINATING SERVICES IN A UNIFIED COMMUNICATION PLATFORM," to Aaron Evans, et al., filed on Jan. 29, 2019, the disclosure of which is hereby incorporated herein by reference, in its entirety and for all purposes.

BACKGROUND

Field

The present disclosure generally relates to communication platforms that provide voice, messaging, and collaboration services between multiple parties that may include local users, remote users, or cross-country and cross-continental users. More specifically, the present disclosure relates to a method for bridging multiple users across multiple networks within a unified communication platform by using a direct inward dialing pool to lease anchor addresses (e.g., phone numbers).

Description of the Related Art

Communications platform providers may not obtain local origination and termination services in specific markets due to local regulations, technological barriers, insufficient bandwidth, or technological incompatibility between the local market and a global (e.g., transnational) market. Common techniques for a customer deployment to integrate local origination and termination services of a local third party carrier or service provider with the unified communication platform deployment are costly, unreliable, and highly constrained by local regulation.

SUMMARY

In one embodiment of the present disclosure, a computer-implemented method is described that includes receiving, from a local market intermediate carrier, a request for a communication between a subscriber of a public network and an end-user endpoint in a local network. The end-user endpoint is associated with an end-user phone number. The computer-implemented method also includes creating a lease for an address anchor in a pool of multiple addresses, and receiving, in a proxy server from a carrier gateway server, a communication request from the end-user phone number to the address anchor. The computer-implemented method also includes establishing a communication channel to the address anchor. The communication channel includes the end-user phone number as a caller ID. The computer-implemented method also includes replacing, in the communication channel, a "from" header with a phone number of the subscriber of the public network, and a "to" header with the end-user phone number, and transmitting data between the subscriber of the public network and the end-user phone number using the communication channel.

According to one embodiment, a system is described that includes one or more processors and a memory coupled to the one or more processors, the memory including instructions that, when executed by the one or more processors, cause the one or more processors to receive, from a local market intermediate carrier, a request for a communication between a subscriber of a public network and an end-user endpoint in a local network. The end-user endpoint is associated with an end-user phone number. The one or more processors also execute instructions to create a lease for an address anchor in a pool of multiple addresses, to receive, in a proxy server from a carrier gateway server, a communication request from the end-user phone number to the address anchor, and to establish a communication channel to the address anchor. The communication channel includes the end-user phone number as a caller ID. The one or more processors also execute instructions to replace, in the communication channel, a "from" header with a phone number of the subscriber to the public network, and a "to" header with the end-user phone number, and to transmit inbound data using the second communication channel.

In one embodiment of the present disclosure, a computer-implemented method is described that includes receiving, in a proxy server, a request for a communication between an end-user endpoint in a local network and a subscriber of a public network. The end-user endpoint is associated with an end-point phone number. The computer-implemented method also includes transmitting, from a proxy server to an anchor service, a request to lease an address anchor from a pool of multiple addresses, and transmitting, from the proxy server to a carrier gateway server, a communication request from the address anchor to the end-user phone number. The computer-implemented method also includes requesting, to a local market intermediate carrier, a communication channel between the address anchor and the end-user phone number through the carrier gateway server, and establishing the communication between the end-user phone number in the local network and the subscriber of the public network.

According to one embodiment, a non-transitory, machine-readable medium is described that includes instructions, which when executed by one or more processors, cause a computer to perform a method including receiving, from a local market intermediate carrier, a request for a communication between a subscriber of a public network and an end-user endpoint in a local network and creating a lease for an address anchor in a pool of multiple addresses. The end-user endpoint being associated with an end-user phone number. The method also includes receiving, in a proxy server from a carrier gateway server, a communication request from the end-user phone number to the address anchor, establishing a communication channel from the end-user phone number to the address anchor, replacing, in the communication channel, a "from" header with a phone number of the subscriber of the public network, and a "to" header with the end-user phone number, and transmitting data between the subscriber of the public network and the end-user phone number using the communication channel.

In yet another embodiment, a system is described that includes a means for storing commands and a means for executing the commands causing the system to perform a method including receiving, from a local market intermediate carrier, a request for a communication between a subscriber of a public network and an end-user endpoint in a local network and creating a lease for an address anchor in a pool of multiple addresses. The end-user endpoint being associated with an end-user phone number. The method also includes receiving, in a proxy server from a carrier gateway server, a communication request from the end-user phone number to the address anchor, establishing a communication channel to the address anchor, wherein the communication channel includes the end-user phone number as a caller ID, replacing, in the communication channel, a "from" header with a phone number of the subscriber of the public network, and a "to" header with the end-user phone number, and transmitting data between the subscriber of the public network and the end-user endpoint using the second communication channel.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed embodiments and, together with the description, serve to explain the principles of the disclosed embodiments. In the drawings.

In the figures, elements and steps denoted by the same or similar reference numerals are associated with the same or similar elements and steps, unless indicated otherwise.

DETAILED DESCRIPTION

Figure 1:
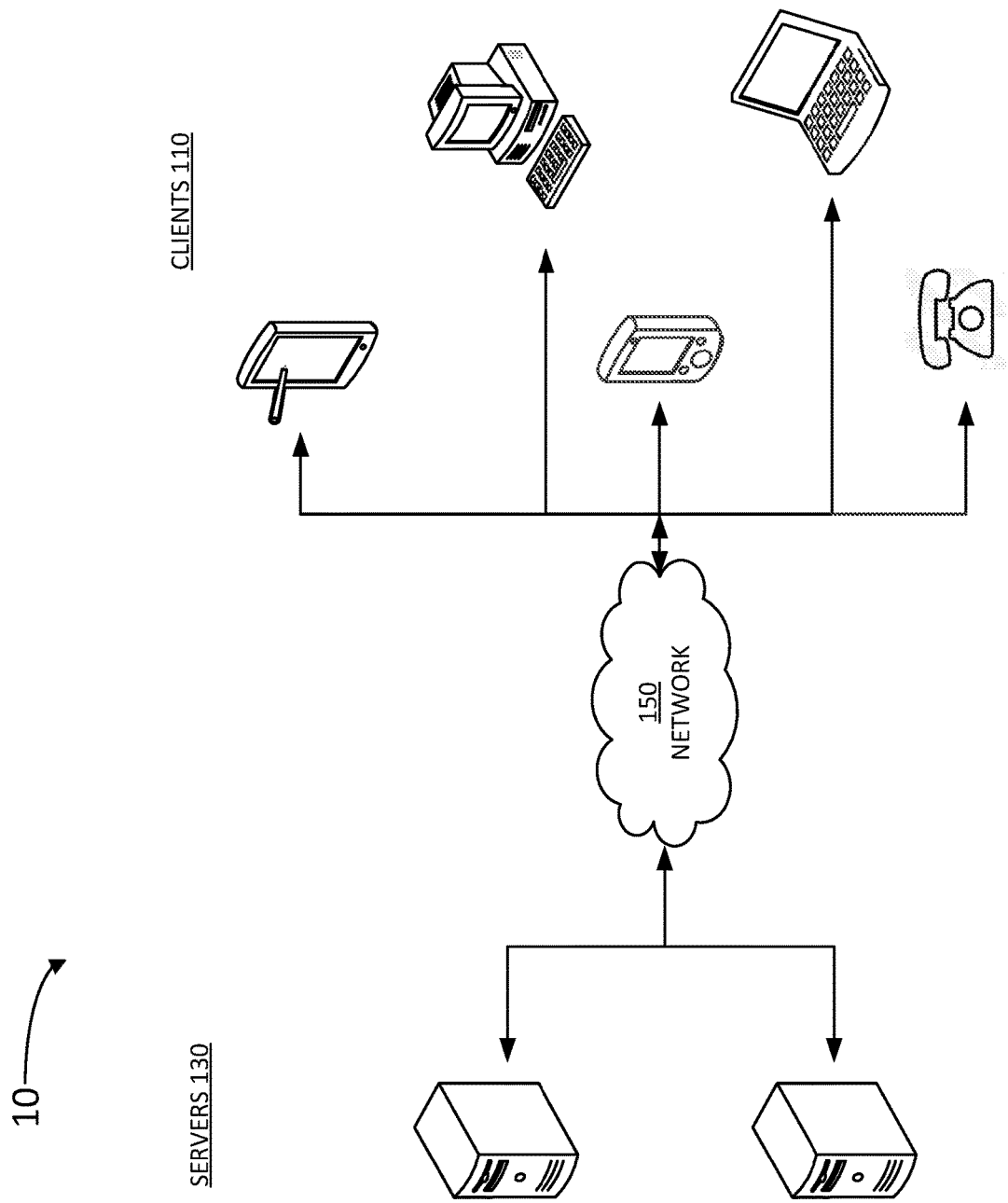
FIG. 1 illustrates an example unified communication platform using a third party bridging service to provide origination and termination services, according to some embodiments.

In the following detailed description, numerous specific details are set forth to provide a full understanding of the present disclosure. It will be apparent, however, to one ordinarily skilled in the art, that the embodiments of the present disclosure may be practiced without some of these specific details. In other instances, well-known structures and techniques have not been shown in detail so as not to obscure the disclosure.

General Overview

Embodiments as disclosed herein include a cloud-based, unified communications platform providing voice, messaging and collaboration services. The service targets medium to large enterprises across a wide spectrum of industries, and also including governmental, non-governmental, and non for profit enterprises. Services provide by unified communication platforms as disclosed herein typically replace customer's existing phone system, including public switched telephone networks (PSTN). Accordingly, customers of unified communication platforms as disclosed herein no longer contract with local telecommunications, directly. In some embodiments, each end-user (customer employee) is assigned a local direct inward dialing (DID, e.g., a phone number), which reflects the country in which the end-user is located. Accordingly, an end-user may be directly dialed from the user's local PSTN market and, when making outbound calls (e.g., from a local market to a global market), present a caller ID for their local PSTN market. Embodiments as disclosed herein provide voice solutions based on voice over internet protocol (VoIP) standards. In most countries and local markets, interconnection with PSTN and mobile networks is accomplished via gateway services provided by local telephone companies or by other partners. A unified communication platform as disclosed herein may establish carrier relationships in many parts of the world (local markets). Thus, customers of unified communication platforms as disclosed herein can leverage PSTN access by using local carrier resources to provide local origination and termination services in many countries in the world. Accordingly, for many countries and other local markets, unified communication platforms as disclosed herein have access to DIDs from local carrier partners. Calls from members of the public or other businesses that are not subscribed in the unified communication platform to a subscribed member are routed to the unified communication platform by dialing from the PSTN. Also, the unified communication platform routes outbound calls (e.g., outside of the platform) to PSTN phone numbers as well as country-specific toll-free and emergency services through local carrier partners.

Unified communication platforms, when successful, acquire a global reach, which imposes certain limitations or constraints given local regulations and technical capabilities in specific markets. For instance, in some configurations, a unified communication platform may not be able to establish a session initiated protocol (SIP) gateway interconnection with a local carrier to service these markets. At the same time, it is desirable for many multinational corporations to consolidate to a unified communication platform for their global communication needs. Embodiments as disclosed herein include unified communication platforms providing solutions that can service a diversity of local markets at a reduced cost and with high reliability.

To solve the problem of providing a unified communication platform, which arises in the technical field of computer networks, embodiments as disclosed herein include systems and methods to provide local origination and termination services to unified communication platforms having clients in diverse local markets. Accordingly, embodiments as disclosed herein seamlessly integrate unified communication platforms with a set of local market direct inward dialing (DID) addresses of a local third party carrier. In some embodiments, a solution includes routing calls originating from a public network to these DIDs to the appropriate user (or call flow within the unified communication platform, according to a configuration within the platform). In some embodiments, users of the unified communication platform make calls to local market public switched telephone network (PSTN) destinations (including emergency numbers and toll-free numbers) while presenting these local market DIDs as the caller ID.

When a unified communication vendor is unable to procure a DID through a carrier SIP gateway partner (e.g., due to regulatory constraints, technical constraints, or cost), embodiments consistent with the present disclosure may use a local gateway delivery model to access the local markets. Some embodiments provide a mechanism for bridging local market calls into the unified communication platform via an intermediate carrier.

In some embodiments, bridging a local call via an intermediate carrier overcomes the inherent challenges of existing approaches using key technical aspects disclosed herein. The disclosed system addresses the problem specifically arising in the realm of computer technology by providing a solution also rooted in computer technology, namely, by bridging calls to local market telephone addresses using a pool of DID addresses selected temporarily by an "anchor" DID application programming interface (API). In some embodiments consistent with the present disclosure, an anchor DID may include a phone number used to terminate a call to the unified communication platform in a transparent way that is not tied to a customer service.

Some of the technical aspects include a DID pool lease system to provide a shared pool of phone numbers to connect calls to/from the intermediate carrier. This may eliminate the need to create and maintain a one-to-one mapping of local market DIDs provided by the intermediary carrier to an equal number of platform supplied international DIDs. Accordingly, embodiments as disclosed herein remove potentially onerous provisioning processes when onboarding new customers and users.

An additional advantage provided by the above technical solution is the reduced list of DID addresses used from the pool, since the anchor DID "lease" is employed only for call setup. Accordingly, the length of time a "lease" of a given anchor DID is active is relatively short. For this reason, a relatively large volume of calls (and relatively large number of end-users) can be supported with a relatively small number of anchor DIDs which represents a cost savings for the provider of the unified communication platform. A ratio of anchor DIDs to provisioned users in the local market may vary from one embodiment to another. Some embodiments include the feature of tuning the ratio by observing call patterns over time. In some embodiments, the ratio may be as low as 5%, 1%, or even lower.

In some embodiments, an anchor DID API server includes an exclusive lock mechanism for the creation of an anchor DID "lease." Accordingly, the solution avoids race conditions (two or more callers attempting to lease the same DID address), which typically arises in a simple one-to-one mapping, and avoids mismatch of callers and destinations, thus enabling a more fault-tolerant and robust solution. This is desirably avoided because when a race condition arises, one of the caller IDs may be lost (e.g., the caller ID in the inbound direction with the simple one-to-one mapping). In some scenarios including a one-to-one mapping with an API call to the unified communication platform from an intermediate bridging carrier, and the originating caller ID may be captured and stored. However, when the call later arrives to a proxy server in the unified communication platform, it may be impossible to properly match the originating caller IDs when there are multiple calls to the same phone number at roughly the same time. A similar conflict may occur under race conditions in the outbound direction.

Example System Architecture

FIG. 1 illustrates an example of a unified communication platform 10 using a third party bridging service to provide origination and termination services, according to some embodiments. Unified communication platform 10 includes servers 130 and clients 110 connected over a network 150. One of the many servers 130 is configured to host a memory including instructions which, when executed by a processor, cause server 130 to perform at least some of the steps in methods as disclosed herein. In some embodiments, the processor in server 130 is configured to host an application for operating a unified communication network between multiple client devices 110. Further, in some embodiments, the processor in server 130 is configured to provide support for collaborative network event applications, and other networking applications such as text messaging services and the like, to a participant in the unified communication network through client device 110. Information related to, and instructions to handle inbound and outbound calls within and outside the unified communication network may be stored in a proxy tool, or a direct inward dialing (DID) tool, or a private exchange (PBX) tool accessible by a participant through a client device 110 (e.g., accessible through a telephone line, a web page, or an application running on client device 110). In some embodiments, at least one, or all, of the proxy tool, the DID tool, or the PBX tool may be included in a bridging engine in one or more of servers 130. Servers 130 can return images, documents, rich-text documents, and the like intended for a shared use and modification by multiple participants in a presence detection system as disclosed herein. In some embodiments, servers 130 are configured to transmit voice over internet protocols (VoIP) data packets to and from one or more client devices 110. For purposes of load balancing, multiple servers 130 can host memories including instructions to one or more processors and multiple servers 130 for hosting one or more tools as disclosed herein.

Servers 130 may include any device having an appropriate processor, memory, and communications capability for hosting the documents and applications associated with the bridging engine. The bridging engine may be accessible by multiple participants through various client devices 110 over the network 150. Client devices 110 can be, for example, desktop computers, mobile computers, tablet computers (e.g., including e-book readers), mobile devices (e.g., a smartphone or PDA), or any other devices having appropriate processor, memory, and communications capabilities for accessing the bridging engine on one of servers 130. Network 150 can include, for example, any one or more of a local area network (LAN), a wide area network (WAN), the Internet, and the like. Further, network 150 can include, but is not limited to, any one or more of the following network topologies, including a bus network, a star network, a ring network, a mesh network, a star-bus network, tree or hierarchical network, and the like.

Figure 2:
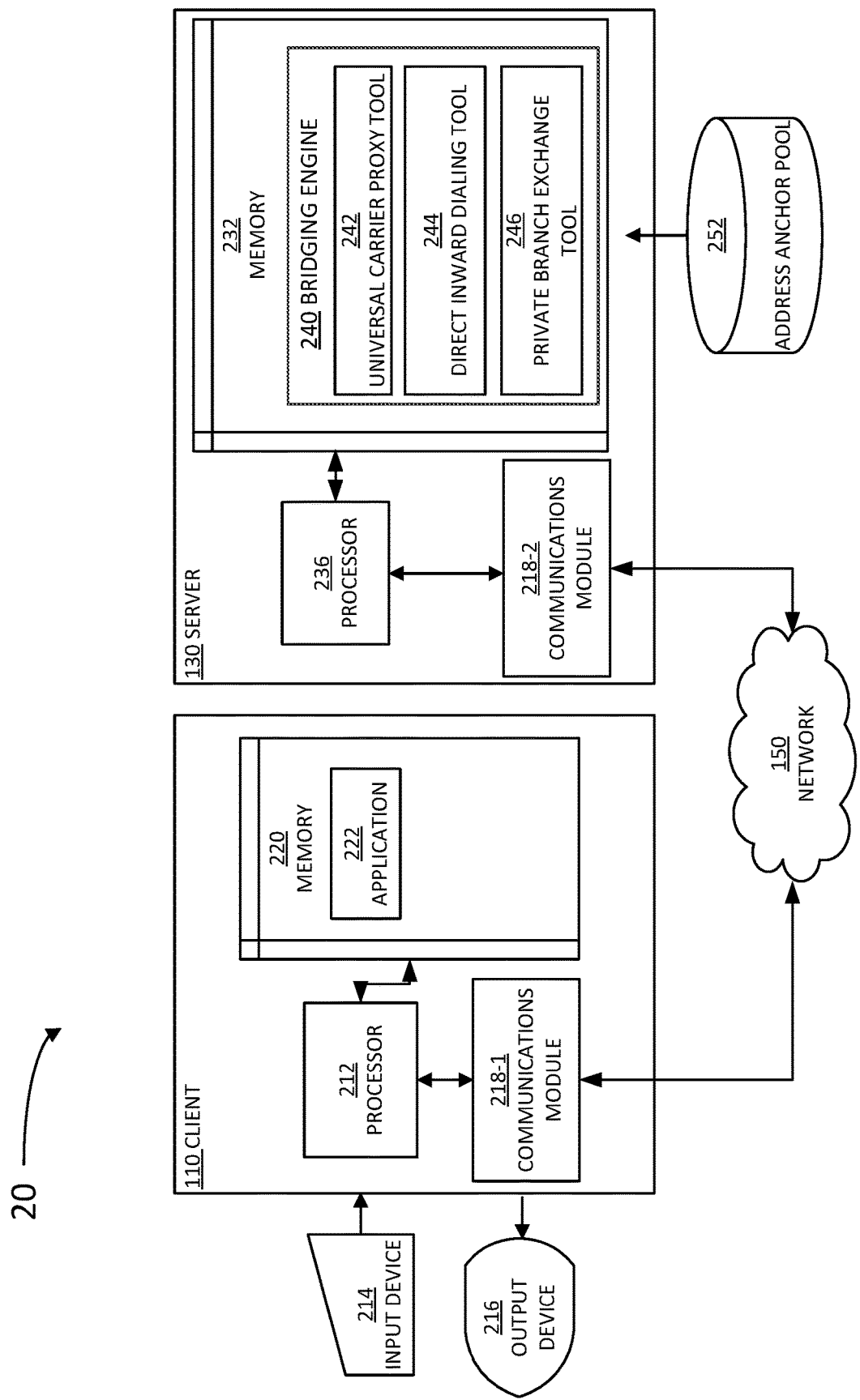
FIG. 2 is a block diagram illustrating an example server and client from the unified communication platform of FIG. 1, according to certain aspects of the disclosure.

FIG. 2 is a block diagram illustrating an example server 130 and client device 110 in a unified communication platform 20 (cf. unified communication platform 10), according to certain aspects of the disclosure. Client device 110 and server 130 are communicatively coupled over network 150 via respective communications modules 218-1 and 218-2 (hereinafter, collectively referred to as "communications modules 218"). Communications modules 218 are configured to interface with network 150 to send and receive information, such as data, requests, responses, and commands to other devices on the network. Communications modules 218 can be, for example, modems or Ethernet cards. In some embodiments, communications modules 218 may be configured to receive and transmit voice data over a telephone network, a wireless cellular network, a data network (e.g., VoIP), or any combination of the above.

Client device 110 may be any one of a desktop computer, a laptop, or a mobile computing device. Client device 110 may include a processor 212 and a memory 220. An input device 214 and an output device 216 enable the user to interact with client device 110. Examples of input device 214 and output device 216 may include a mouse, a keyboard, a display, a touch-interactive display, and the like.

Processor 236 is configured to execute instructions, such as instructions physically coded into processor 236, instructions received from software in memory 232, or a combination of both. A user of client device 110 may use input device 214 to request a communication (e.g., a telephone call) with another client device 110 to bridging engine 240 via a user interface of an application 222. The document submitted by the user may include an application-based document (e.g., a text-rich document such as a Word document, a PDF document, or any other document accessible through a text editing application, including a computer code sequence, and the like), a spreadsheet document (e.g., Excel and the like), a presentation document (e.g., Power Point and the like), an XML file, an HTML file, or a multi-media file such as a video, audio, image file, or any combination of the above. In some embodiments, the request for a communication may include a telephonic conversation (e.g., direct voice communication) which may include VoIP data packets, or audio data sent over a telephone line.

Server 130 includes a memory 232, a processor 236, and a communications module 218-2. The user interface is displayed for the user in an output device 216 of client device 110. Memory 232 includes a bridging engine 240 and an address anchor pool 252. Bridging engine 240 includes instructions which, when executed by processor 236, cause server 130 to perform at least partially steps as disclosed herein. In some embodiments, bridging engine 240 includes instructions to communicate with application 222 in client device 110 to establish a communication channel with one or more other client devices 110 using a universal carrier proxy tool 242 and a private branch exchange (PBX) tool 246. In some embodiments, establishing the communication channel between one or more client devices 110 may include determining that one or more of client devices 110 is a subscriber of a client network of server 130. For example, in some embodiments, client device 110 having application 222 installed in memory 220 is a subscriber of a client network of server 130. In some embodiments, at least one of client devices 110 participating in a communication channel hosted by server 130 may not be a subscriber of a client network of server 130. For example, in some embodiments, at least one of client devices 110 participating in a communication channel may be a subscriber of a public network.

Bridging engine 240 may also include instructions to store dialing information in an address anchor pool 252. The dialing information may include multiple addresses (e.g., telephone numbers) registered within unified communication platform 20 that may be used for bridging in, within a communication channel, a client device 110 that is a subscriber of a public network. Accordingly, address anchor pool 252 may include direct inward dialing (DID) telephone numbers accessible to client devices 110 within unified communication platform 20, using a DID tool 244. In some embodiments, the public network may be outside of unified communication platform 20.

The user may access bridging engine 240 through application 222 installed in memory 220 of client device 110. The user may also access bridging engine 240 via a web browser installed in client device 110, or simply by dialing a telephone number (e.g., a DID number in address anchor pool 252, or any other number registered within unified communication platform 20). Execution of application 222 may be controlled by a processor 212 in client device 110. In some embodiments, application 222 is downloaded and installed by the user into client device 110, from server 130.

Figure 3:
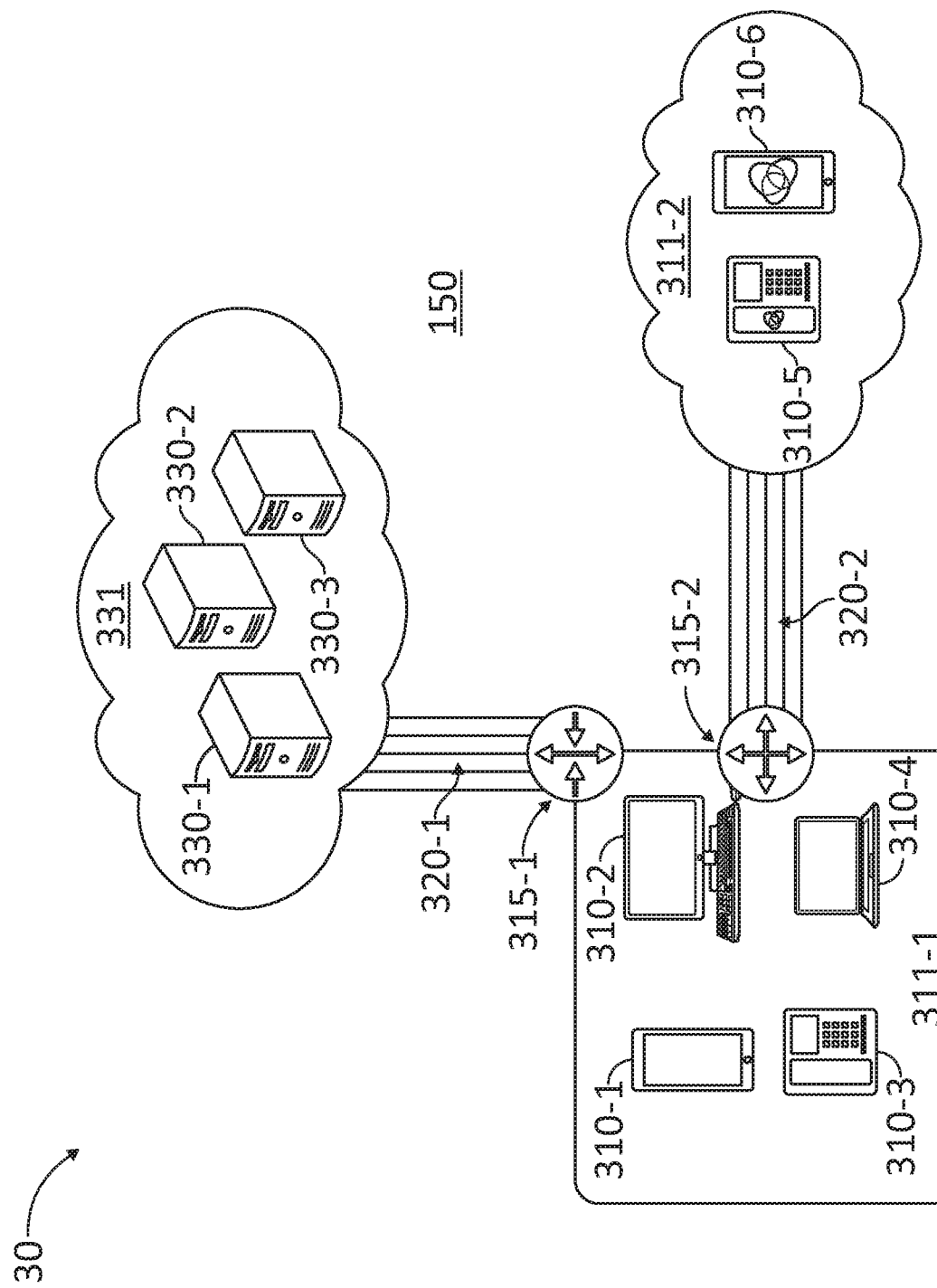
FIG. 3 illustrates a local gateway delivery model, according to some embodiments.

FIG. 3 illustrates a local gateway delivery model in a unified communication platform 30, according to some embodiments. Unified communication platform 30 includes a global infrastructure 331 with servers 330-1, 330-2, and 330-3 (hereinafter, collectively referred to as "servers 330"), communicatively coupled with a customer site 311-1 that includes client devices 310-1, 310-2, 310-3, and 310-4, through network 150. Client devices 310-1 through 310-4 may include an application installed and/or hosted by one of servers 330. A public switch telephone network (PSTN) 311-2 may include client devices 310-5 and 310-6. Accordingly, in some embodiments, servers 330 may not have an application installed on devices 310-5 and 310-6, and no direct communication to those client devices.

A customer router 315-1 (on-site) enables and routes data packets between servers 330 and client devices 310-1 through 310-4 in customer site 311-1. In some embodiments, customer router 315-1 is provided by unified communication platform 30. In some embodiments, customer router 315-1 is provided by customer site 311-1. Either way, customer router 315-1 is configured and controlled by servers 330. A customer connectivity 320-1 is established between global infrastructure 331 and customer site 311-1, and provided by unified communication platform 30. In some embodiments, customer connectivity 320-1 may include private network addresses sponsored and maintained by unified communication platform 30 (e.g., SIP/VoIP, or other IP addresses in a network accessible by client devices 310-1 through 310-4, and the like).

A physical hardware gateway 315-2 enables connectivity through multiple local telephone lines 320-2 between customer site 311-1 and PSTN 311-2. In some embodiments, physical hardware gateway 315-2 is provided, authorized, and supervised by unified communication platform 30 through one or more of servers 330. Telephone lines 320-2 may be multiple local telephone lines acquired, leased, or purchased from a local third party provider.

In some countries, unified communication platform 30 is unable to obtain local origination and termination services, and therefore it is desirable to use on premise (e.g., customer location) physical hardware gateway 315-2 connected to PSTN lines provided by a third party carrier. In some embodiments, calls to and from a local market are routed via physical hardware gateway 315-2 rather than gateway servers such as one of servers 330.

In embodiments where customer site 311-1 obtains PSTN lines from a third party carrier and purchases additional equipment (the "local gateway" hardware), the cost may be carried by the customer. In the event the customer premise loses power or cannot reach global infrastructure 331 due to a network disruption, calls to/from PSTN 311-2 may be disrupted (e.g., for calls to a local main number, the caller cannot even be put into an auto-attendant IVR since this is defined in global infrastructure 331). In some embodiments, it is desirable to reduce additional latency for calls to/from PSTN 311-2 due to the extra leg between customer site 311-1 and global infrastructure 331. In some embodiments, interconnection between PSTN 311-2 with a VoIP communication platform in this architecture may be restricted by local regulations (e.g., India).

Figure 4:
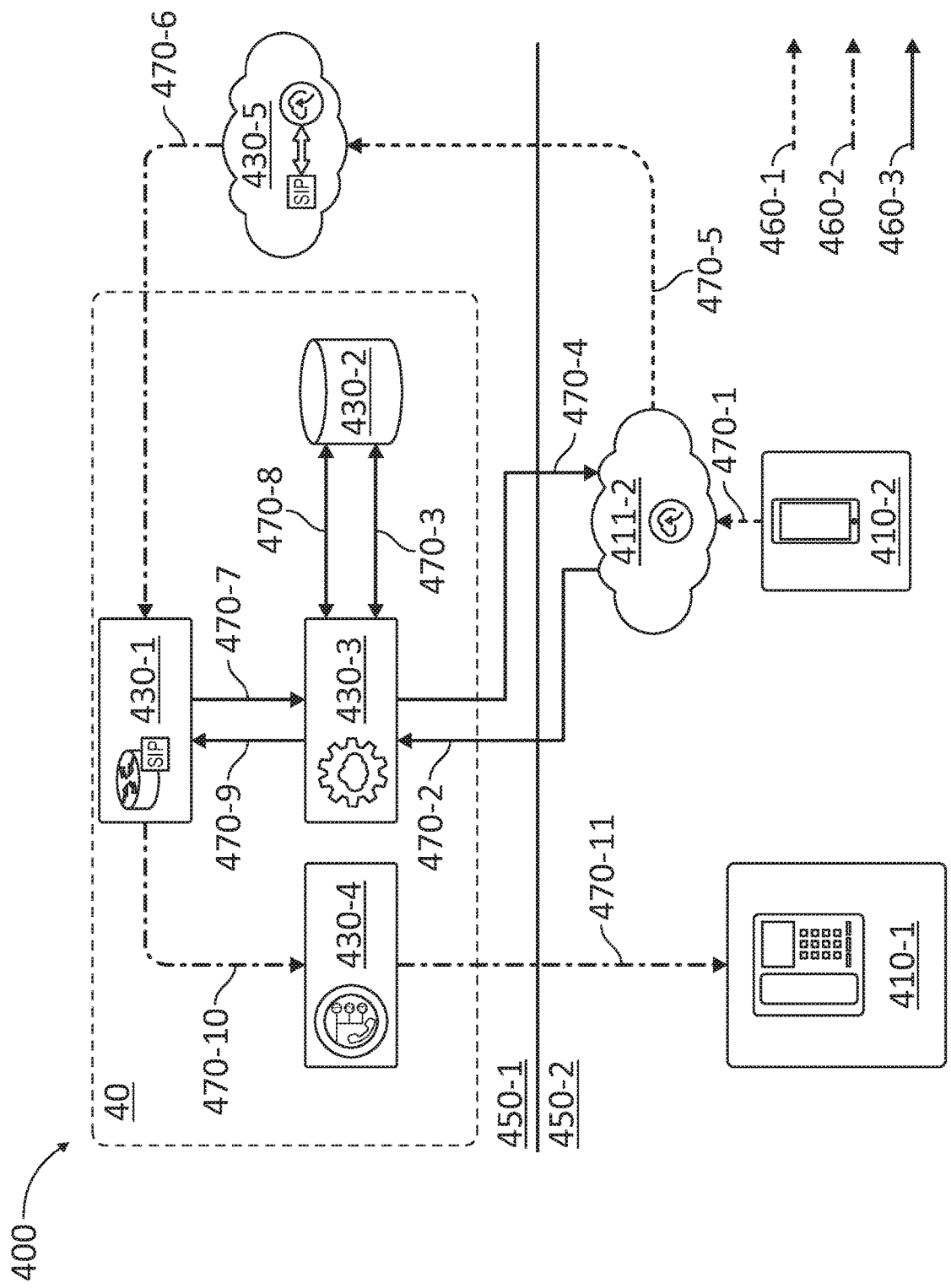
FIG. 4 illustrates an inbound scenario using a direct inward dialing pool for originating and terminating services in a unified communication platform, according to some embodiments.
Figure 5:
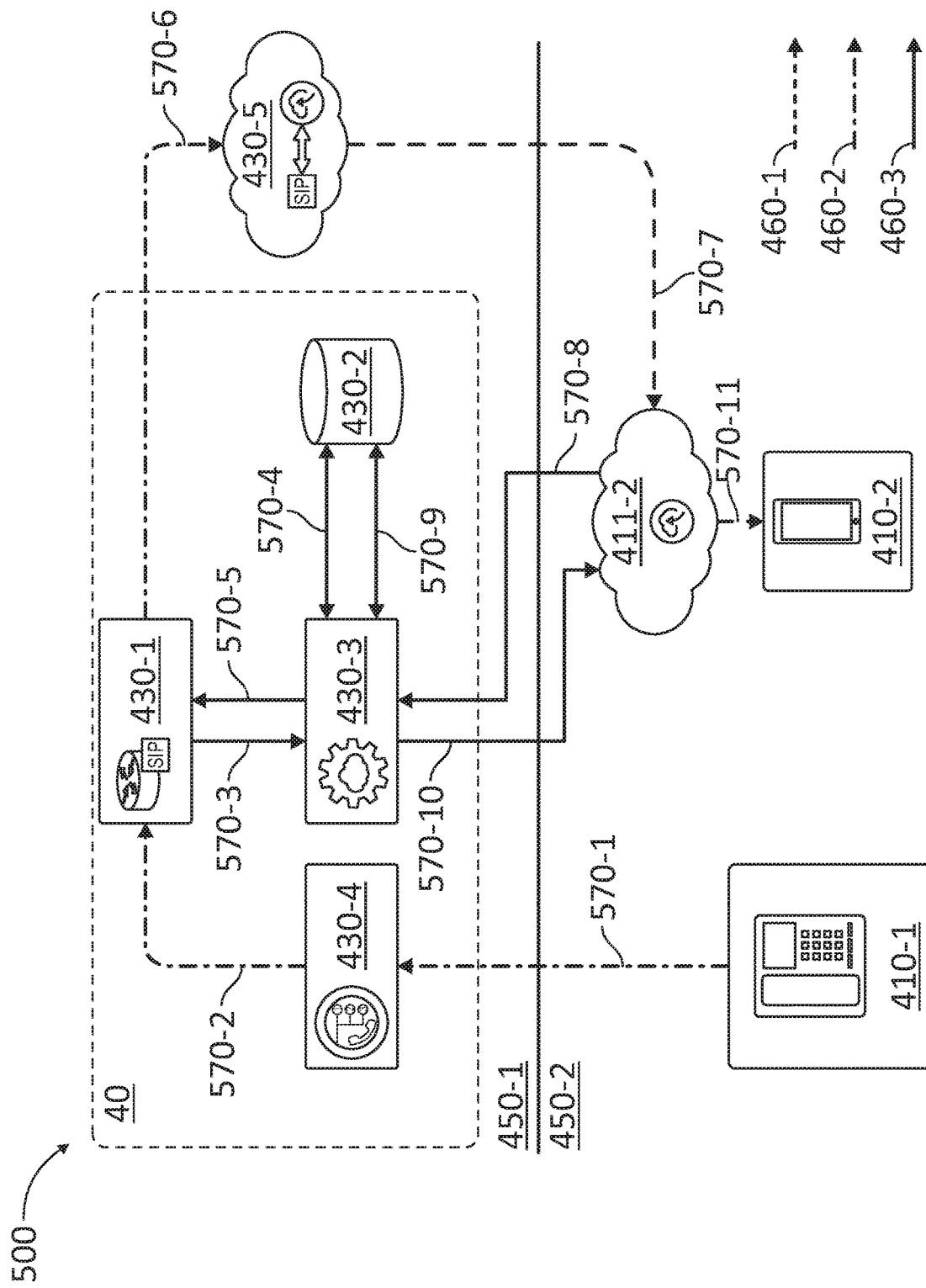
FIG. 5 illustrates an outbound scenario using a direct inward dialing pool for originating and terminating services in a unified communication platform, according to some embodiments.

To mitigate the above limitations, a DID pool may be implemented, as illustrated in FIGS. 4 and 5, discussed below. Using a DID pool removes the need to deploy equipment and hardware to a customer site for calls to be delivered to/from the PSTN. Thus adding reliability, flexibility, and reduced cost to the platform.

FIG. 4 illustrates an inbound scenario 400 using a direct inward dialing pool for originating and terminating services in a unified communication platform 40, according to some embodiments. Inbound scenario 400 involves a local caller using a non-platform client device 410-2 that is not a client of unified communication platform 40 making an inbound call to a platform client device 410-1 that is a client of unified communication platform 40. Unified communication platform 40 includes one or more servers and databases such as proxy server 430-1, Anchor DID Pool 430-2, Anchor DID API Server 430-3, and a PBX server 430-4 in a global market 450-1.

PBX server 430-4 provides the core voice feature used by businesses including extensions, voicemail, auto-attendants, etc. In some embodiments, PBX server 430-4 may be built out of a number of sub-components in any number of arrangements and architectures. In some embodiments, these components are hosted in a global market 450-1 of unified communication platform 40.

Platform client device 410-1 is an end-user endpoint of unified communication platform 40 and can take the form of physical handsets and other audio hardware as well as software such as softphones running on user workstations or mobile devices. Platform client devices 410-1 may be deployed to customer locations and networks in a local market 450-2. Platform client devices 410-1 typically connect to unified communication platform 40 using SIP or some other VoIP technology either directly or indirectly via an edge proxy service (e.g., a Web RTC proxy).

Some embodiments include a SIP gateway server 430-5 to provide termination and origination services to facilitate interconnectivity between unified communication platform 40 and non-platform client device 410-2, through PSTN legs 460-1. In some embodiments, SIP gateway server 430-5 may be provided by third party carrier partners and are not part of unified communication platform 40. In some embodiments a carrier may roll out a unified communication platform offering and use their own SIP gateway server 430-5 rather than one provided by a third party partner.

In some embodiments, SIP gateway server 430-5 converts VoIP calls to native PSTN calls and vice versa. Unified communication platform 40 typically interconnects with SIP gateway server 430-5 using one or more SIP trunks. In some embodiments, proxy server 430-1 acts as the termination point for one or more Carrier SIP Trunks and facilitates transport of VoIP calls between PBX server 430-4 and SIP gateway server 430-5. In some embodiments, the carrier trunks may interconnect within PBX server 430-4 without any mediation by proxy server 430-1. In some embodiments, proxy server 430-1 provides a robust, fault-tolerant system as well as allowing for optimizations such as least cost routing LCR by utilizing multiple carriers.

An intermediate carrier 411-2 includes a carrier capable of obtaining DIDs in local market 450-2. In some embodiments, intermediate carrier 411-2 may not provide SIP gateway service thus carrier services may not interconnect with unified communication platform 40 via SIP. In some embodiments such configuration is constrained by regulations or technical capabilities in local market 450-2. Accordingly, proxy server 430-1, Anchor DID Pool 430-2, Anchor DID API Server 430-3, and a PBX server 430-4 in unified communication platform 40 are configured to overcome such limitations.

Inbound scenario 400 includes 3 categories of phone numbers (DIDs), as follows. A first category (A), such as used in platform client device 410-1, is an Assigned Local Market DIDs. Phone numbers A are Local Market phone numbers issued by intermediary carrier 411-2 and will be assigned to a customer of unified communication platform 40 (e.g., platform client device 410-1).

A second category (B) is an International DID. Phone numbers B may be obtained by SIP gateway server 430-5 for unified communication platform 40. Phone numbers B are "international" from the perspective of local market 450-2. For example, when an A phone number is an Indian PSTN DID, a DID of type B may not be Indian PSTN DIDs but rather those of a different country altogether. B phone numbers may be used for PSTN legs 460-1 between unified communication platform 40 and intermediate carrier 411-2 (e.g., through SIP gateway server 430-5). In some embodiments, the specific country associated with phone numbers B is not limiting, and transparent for inbound scenario 400. In some embodiments, several factors may influence the selection of phone numbers B (e.g., country and the like), such as latency and reliability. Accordingly, DIDs B may be procured from SIP gateway server 430-5 located in nearby markets, thus reducing latency (e.g., Japan phone numbers, or China phone numbers, for an A phone number based in India). Selection of DID B from such short-range carriers may be limited (e.g., not many Japanese phone numbers or Chinese phone numbers available to service India). In some embodiments, unified communication platform 40 may benefit from B-type DIDs from a reliable SIP gateway server 430-5 to avoid service disruptions (e.g., while making and receiving calls although for outbound, a secondary carrier may be employed). In some embodiments, unified communication platform 40 procures B-type DIDs from multiple vendors, to mitigate the risk of a service disruption with any one carrier. In some embodiments, selection of B-type DIDs may be be optimized to reduce cost. Accordingly, calls to and from A-type DIDs will be as low as possible (while also considering latency and reliability).

A third category (C) includes local market PSTN phone numbers associated with non-platform client device 410-2. Type-C phone numbers may include emergency and toll-free numbers, and are selected within local market 450-2. Type C phone numbers are not assigned to unified communication platform 40 (or to SIP gateway server 430-5) nor are they assigned to intermediate carrier 411-2. Type-C DIDs represent businesses or members of the public in local market 450-2 that the customer (through platform client device 410-1) is looking to communicate with, via phone calls.

In the inbound scenario, a business or member of the public with a local market public switched telephone network (PSTN) number in a local market 450-2 calls a local market DID (A, e.g. platform client device 410-1) assigned to a customer of unified communication platform 40, but provided by the intermediate carrier 411-2. That is, the call is made to A. For this type of call, local market PSTN phone number (C) may be referred to as a caller ID number. That is, the call is made from: C. The inbound scenario includes a PSTN leg of the communication protocol 460-1, a VoIP leg 460-2, and an API or other network application protocol 460-3. The inbound scenario starts with PSTN leg 460-1, and multiple API legs 460-3 followed by VoIP legs 460-2 over multiple stages 470-1, 470-2, 470-3, 470-4, 470-5, 470-6, 470-7, 470-8, 470-9, 470-10, and 470-11 (hereinafter, collectively referred to as "inbound stages 470"). Each of the inbound stages may be described as follows.

In stage 470-1, local market external party (C) 410-2 places a call to platform client device 410-1 in local market 450-2 by dialing DID (A), terminating via PSTN leg 460-1 to intermediate carrier 411-2. In stage 470-2, intermediate carrier 411-2 makes an API request to Anchor DID API Server 430-3 and includes the call details (from: C; to: A) in the API request.

In stage 470-3, Anchor DID API Server 430-3 inspects the Caller ID ("from" phone number) to see if it is a known phone number in an anchor DID Pool 430-2. In this case (inbound scenario), it is not in anchor DID Pool 430-2 since the caller ID phone number is C, an external local market PSTN phone number. Thus, Anchor DID API Server 430-3 knows that this is an inbound call. Note that, in some embodiments, Anchor DID API Server 430-3 distinguishes between inbound and outbound scenarios. In some embodiments, in stage 470-3, Anchor DID API Server 430-3 may create an "active lease" record in DID Pool 430-2 for an available DID (B) from anchor DID Pool 430-2. This "active lease" record contains: i) a date and time of lease; ii) an anchor DID (B) that was leased; iii) a destination phone number (A); iv) a caller id phone number (C); and v) a direction—inbound.

In stage 470-4, Anchor DID API Server 430-3 adds the leased anchor DID (B) to the API response sent back to intermediate carrier 411-2. In stage 470-5, intermediate carrier 411-2 creates a second PSTN leg 460-1 to the anchor DID (B) using local market DID (A) (the DID that was dialed and triggered the execution of the flow/script) as the caller ID. This second PSTN leg terminates via the PSTN to a carrier partner of unified communication platform 40 that provides origination and termination services for DID (B) via a SIP gateway server 430-5. Upon acceptance of the call, intermediate carrier 411-2 bridges the two PSTN legs (in stages 470-5 and 470-1, respectively) and the caller (C) hears progress tones (e.g., ringing). Note that the actual implementation and timing of the bridging of the two PSTN legs 460-1 by intermediate carrier 411-2 may vary and is not limiting. In stage 470-6, SIP gateway server 430-5 converts the call from the PSTN to a VoIP call and routes it to proxy server 430-1 within the unified communication platform 40 via an established SIP Trunk. In stage 470-7, proxy server 430-1 recognizes that the inbound call is to a known DID (B) from anchor DID Pool 430-2. As such, an API call is made to a special Anchor DID API Server 430-3 endpoint for the inbound scenario with the call details.

In stage 470-8, Anchor DID API Server 430-3 looks up the "active lease" record for the given anchor DID (B). In some embodiments, in stage 470-8, Anchor DID API Server 430-3 also prepares a response to the API call instructing proxy server 430-1 to route the call to DID (A) within unified communication platform 40, and to set the caller ID information to be PSTN caller (C). In some embodiments, in stage 470-8, Anchor DID API Server 430-3 also deletes the "active lease" record (or marks it inactive) for the given anchor DID (B) so that it is returned to the DID Pool 430-2 and available for a new call setup.

In stage 470-9, proxy server 430-1 receives the API response from Anchor DID API Server 430-3. In stage 470-10, proxy server 430-1 routes the call to a PBX server 430-4 with appropriate headers (e.g., to: A, from: C). In stage 470-11, since DID (A) is configured as the DID for a specific end-user in a network that is a client of unified communication platform 40, PBX server 430-4 dials an end-user endpoint of a client of unified communication platform 40. The end-user is presented with a call on their UCaaS end-user endpoints from external PSTN caller (C). Upon answering, the callers are connected.

In some embodiments, an inbound scenario may not involve end-users, as disclosed herein. For example, a local market DID (A) may be a main number that is configured to enter an auto-attendant or some kind of an interactive voice response (IVR). The flow is the same until stage 470-11 where, instead of dialing user endpoints, the call is answered by an IVR menu or similar application. Anchor DID Pool 430-2 is populated using DIDs of category B: international DIDs obtained by unified communication platform 40 (e.g., by SIP gateway server 430-5).

In some embodiments, the DIDs are "international," from the perspective of local market 450-2. For example, when local market DIDs (A) is India, PSTN DIDs and DIDs of type B are not India PSTN DIDs, but rather those of a different country. These DIDs may be used for PSTN call legs 460-1 between unified communication platform 40 and intermediate carrier 411-2, or even carrier partner's SIP gateway server 430-5. In some embodiments, for a given customer seeking service for an office within local market 450-2, a certain number of DIDs of category (A) are procured from local market intermediary carrier. In some embodiments, DIDs may be configured with a standard script or flow that executes when an inbound call arrives for that DID. This script/flow makes an API request containing the call information (number dialed and caller ID) to an API endpoint hosted by unified communication platform 40. The script also forwards the call to a destination phone number returned in the response of the API call (by creating a second PSTN leg 460-1 and bridging the two PSTN legs).

Some embodiments include provisioning and setting up services from unified communication platform 40. Accordingly, each voice service requiring a DID for configuration may be configured with one of the local market DIDs (A), even though unified platform 40 may not do origination and termination for these DIDs through SIP gateways of their carrier partners.

In some embodiments, each end-user of unified communication platform 40 is assigned a voice service that includes a local market DID (A). In some embodiments, it is desirable that when user (A) makes a call to local market PSTN phone number (C), the subscriber (C) will be presented with the caller ID (A). It is also desirable that when a local market PSTN caller (C) calls a phone number (A) within unified communication platform 40, the call is correctly routed to the user and the caller ID (C) is preserved.

FIG. 5 illustrates an outbound scenario 500 using a direct inward dialing pool for originating and terminating services in a unified communication platform 40, according to some embodiments. In outbound scenario 500, end-user of unified platform 40 is assigned a local market DID (A), provided by intermediate carrier 411-2, which uses one of their End-User Endpoints to dial PSTN phone number (C) belonging to a business or member of the public in local market 450-2. That is, the call is made to phone number C. Within PBX server 430-4, local market DID (A) is initially used as the caller ID number. That is, the call is made from A. Legs 460-1, 460-2 and 460-3 are as described above with regard to inbound scenario 400.

In stage 570-1, local market DID (A) dials local market PSTN phone number (C) using one of the end-user endpoints of unified communication platform 40. In stage 570-2, PBX server 430-4, which is responsible for handling calls to/from end-user endpoints of unified communication platform 40, determines that destination phone number (C) is not a phone number known to be serviced within unified communication platform 40 (e.g., C is not a provisioned phone number associated with any client of unified communication platform 40). Based on this, PBX server routes the call to proxy server 430-1, with appropriate headers (e.g., to: C, from: A). In stage 570-2, if the dialed number had turned out be another phone number (or extension) provisioned within unified communication platform 40, then the call is kept "on-net" and never leaves the unified communication platform 40 for termination. This is not limiting, as any other convention may be applied to reduce telecommunication costs by avoiding unnecessary origination and termination via carrier partners.

In stage 570-3, proxy server 430-1 contains a special configuration for outbound calls to the given local market when made by end-users within that local market. In other words, both the "from" (A) and "to" (C) are DIDs within local market 450-2. Accordingly, an API call is made to Anchor DID API Server 430-3 for the outbound scenario, including the call details. In stage 570-4, Anchor DID API Server 430-3 creates an "active lease" record in the database for an available DID (B) from anchor DID Pool 430-2. This "active lease" record contains: i) a date and time of lease; ii) an anchor DID (B) that was leased; iii) a destination phone number (C); iv) a caller ID phone number (A); and v) a direction—outbound. In stage 570-3, when the destination phone number is some other international number outside the jurisdiction, unified communication platform 40 may choose to send the call via its existing carrier partners rather than the intermediary carrier for cost, quality, and latency reasons.

In stage 570-5, Anchor DID API Server 430-3 sends a response back, instructing proxy server 430-1 to route the call to the PSTN to local market DID (A) while using the anchor DID (B) as the caller ID. In stage 570-6, proxy server 430-1 routes the call to gateway server 430-5 with appropriate headers (e.g., to: A; from: B). In stage 570-7, the gateway server 430-5 converts the call from VoIP and propagates it to the PSTN for termination. The call arrives for DID (A) via the PSTN to intermediate carrier 411-2. In stage 570-8, intermediate carrier 411-2 makes an API request to Anchor DID API Server 430-3 and includes the call details (from: B; to: A) in the API request.

In stage 570-9, Anchor DID API Server 430-3 inspects the Caller ID ("from" phone number) to see if it is a known phone number in anchor DID Pool 430-2. In this case (outbound scenario), it is indeed in anchor DID Pool 430-2 since the Caller ID phone number is B, an anchor DID. Thus, Anchor DID API Server 430-3 knows that this is an outbound call. In some embodiments, it is desirable that Anchor DID API Server 430-3 distinguish between inbound scenario 400 and outbound scenario 500. In stage 570-9, Anchor DID API Server 430-3 also looks up the "active lease" record for the given Anchor DID (B). In stage 570-9, Anchor DID API Server 430-3 also prepares a response to the API call instructing the Local Market Intermediate Carrier to terminate the call to the local market PSTN DID (C). In stage 570-9, Anchor DID API Server 430-3 also deletes the "active lease" record (or marks it inactive) for the given anchor DID (B) so that it is returned to the pool and available for another call setup. In stage 570-10, intermediate carrier 411-2 receives the API response.

In stage 570-11, intermediate carrier 411-2 creates a second PSTN leg 460-1 to local market PSTN DID (C) using local market DID (A), which is the DID that was dialed and triggered the execution of the flow/script, as the caller ID. Also in stage 570-11, the second leg terminates via the PSTN to a local market downstream carrier providing service for the subscriber with phone number (C). In some embodiments, in stage 570-11, upon acceptance of the call, intermediate carrier 411-2 bridges the two PSTN legs, and end-user (A) continues to hear progress tones (e.g., ringing). Note that the actual implementation and timing of the bridging of the two legs by the intermediary carrier may vary and is not limiting of different embodiments consistent with the present disclosure. The business of members of the public with DID (C) is presented with a call from (A) and upon answering, the callers are connected.

When end-users of unified communication platform 40 are not located in local market 450-2, the outbound call from A to C may be handled by the local PSTN, and the unified communication platform may terminate the call via its existing carrier partners. For example, when a U.S. user of unified communication platform 40 calls an India PSTN DID, the unified communication platform 40 is free to terminate the call through its existing carrier partners, who may also terminate the call via downstream carrier partners.

To avoid situations where leases are created but not released due to some failure in the call path, some embodiments include a cleanup daemon service or thread in unified communication platform 40. Note that, in some embodiments, the anchor DID is only used during call setup and released before the two parties are connected; therefore, the amount of time a lease is in use should be a matter of seconds (generally less than 5 seconds and up to 10 or 15 seconds).

The lease cleanup worker service runs on a configured schedule (e.g., every 15 seconds) and searches for active leases that have been active for some configurable threshold (e.g., 30 seconds) and will automatically release the lease under the assumption that something has gone wrong. The cleanup worker may log a fault in this case. Monitoring services can then be employed to look for a relatively high number of faults in a relatively short period of time and alert unified communication platform 40.

Additionally, the lease cleanup checks the percentage of anchor DIDs with active leases with each run. When the percentage is above a configurable threshold, a fault is logged. Again, monitoring services can then be employed to look for a relatively high number of high utilization faults in a relatively short period of time and alert unified communication platform 40 that it may be desirable to add more DIDs to anchor DID Pool 430-2.

Figure 6:
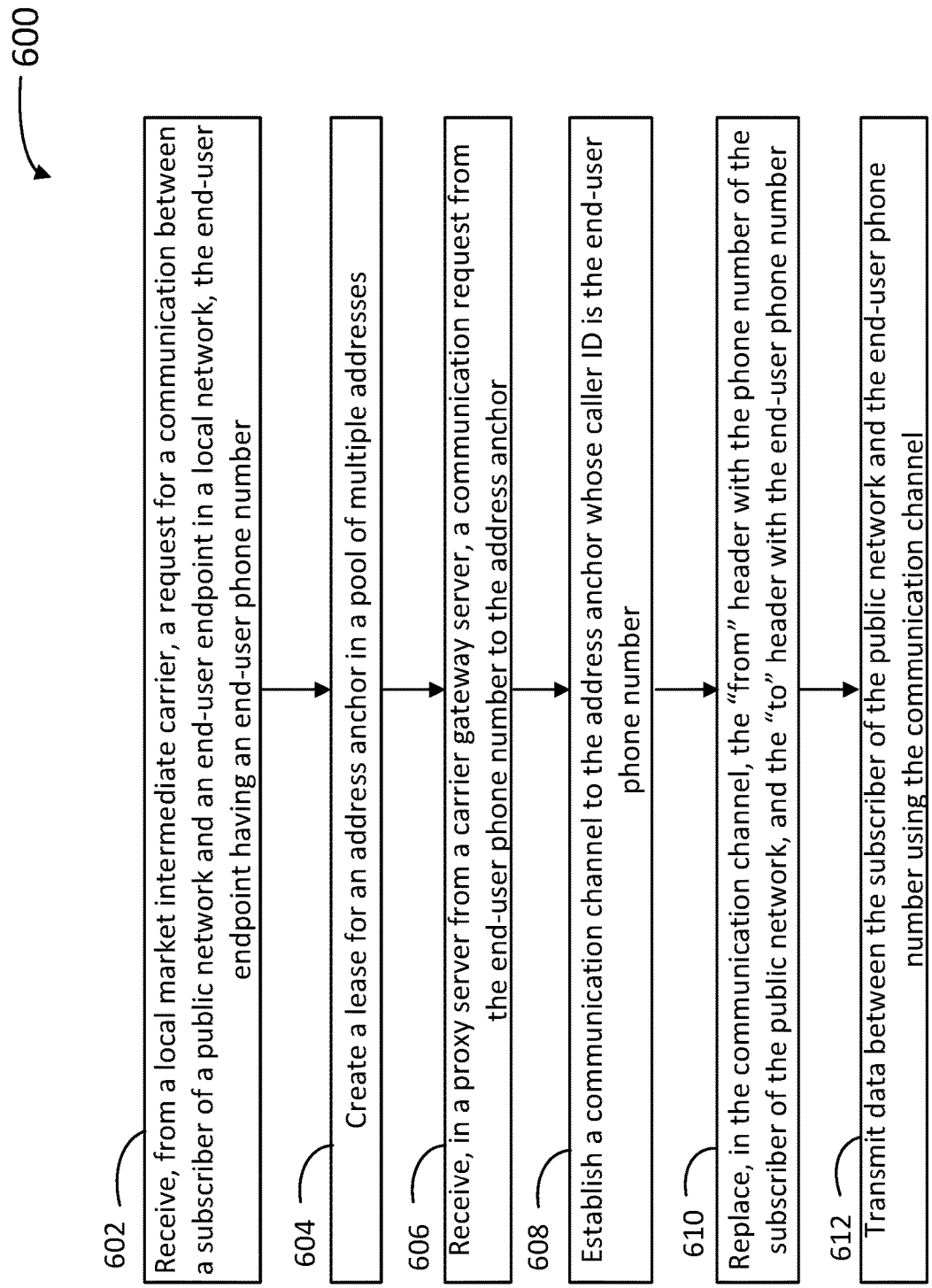
FIG. 6 is a flowchart illustrating steps in a method for managing inbound calls from a local market using a direct inward dialing pool, according to some embodiments.

FIG. 6 is a flowchart illustrating steps in a method 600 for managing inbound calls from a local market using a direct inward dialing pool, according to some embodiments. Method 600 may be performed at least partially by any one of the network servers hosting a bridging engine (e.g., bridging engine 240), while communicating with any one of a plurality of client devices in a unified communication platform (e.g., servers 130 and clients 110 in unified communication platforms 10, 20, 30, 40, and 50). The unified communication platform may include an international market and a local market (e.g., local market 450-2 and global market 450-1). The local market may include a local network serviced by the unified communication platform and a public network that may be outside the unified communication platform, and serviced by a local market intermediate carrier (e.g., customer site 311-1, SIP gateway server 430-5, PSTN 311-2, and intermediate carrier 411-2). In some embodiments, the server may include a proxy server or a carrier gateway server, including a universal carrier proxy tool (e.g., universal carrier proxy tool 242). The bridging engine may also include a DID tool, a private exchange tool, or both (e.g., DID tool 244 and PBX tool 246). At least some of the steps in method 600 may be performed by a computer having a processor executing commands stored in a memory of the computer (e.g., processors 212 and 236, memories 220 and 232). For example, at least some of the commands may be included in an application installed in a client device accessible by a user (e.g., application 222). Further, steps as disclosed in method 600 may include retrieving, editing, and/or storing information in a pool of multiple addresses that is part of, or is communicably coupled to, the computer (e.g., address anchor pool 252). For example, the address anchor pool may include multiple phone numbers for bridging a third party call with a DID number (e.g., address anchor) within the unified communication platform. Methods consistent with the present disclosure may include at least some, but not all, of the steps illustrated in method 600, performed in a different sequence. Furthermore, methods consistent with the present disclosure may include at least two or more steps as in method 600 performed overlapping in time, or almost simultaneously.

Step 602 includes, receiving, from the local market intermediate carrier, a request for a communication between a subscriber of the public network and an end-user endpoint in the local network. In some embodiments, an "endpoint" of the unified communication platform includes a softphone or physical handset registered with the platform, having an end-point phone number associated with it.

Step 604 includes creating a lease for an address anchor in a pool of multiple addresses. In some embodiments, step 604 includes creating a lease record in a database, the lease record including a date and time of lease, the anchor address, a destination phone number of the end-user endpoint and a phone number of the subscriber of the public network, and a direction of the communication.

Step 606 includes receiving, in a proxy server from a carrier gateway server, a communication request from the end-user phone number to the address anchor. In some embodiments, step 606 includes transmitting, to the local market intermediate carrier, the address anchor in replacement of the end-user endpoint.

Step 608 includes establishing a communication channel to the address anchor whose caller ID is the end-user phone number.

Step 610 includes replacing the communication channel with a second communication channel from the subscriber of the public network to the end-user endpoint.

Step 612 includes transmitting data between the subscriber of the public network and the end-user endpoint using the second communication channel. In some embodiments, step 612 includes bridging a client device in the public network with an end-user endpoint device with at least audio data packets. In some embodiments, step 612 includes setting, in the proxy server, a phone number of the subscriber of the public network as an origin of the second communication channel. In some embodiments, step 612 includes releasing the lease for the address anchor when the communication between the subscriber of the public network and the end-user endpoint is established. In some embodiments, step 612 includes inspecting the request to determine whether a telephone number of the subscriber of the public network exists in the pool of multiple addresses, and determining that the request for communication is an inbound call when the telephone number of the subscriber of the public network is not in the pool of multiple addresses. In some embodiments, step 612 includes deleting an active lease record for the address anchor when the lease is released after replacing the communication channel with the second communication channel.

Figure 7:
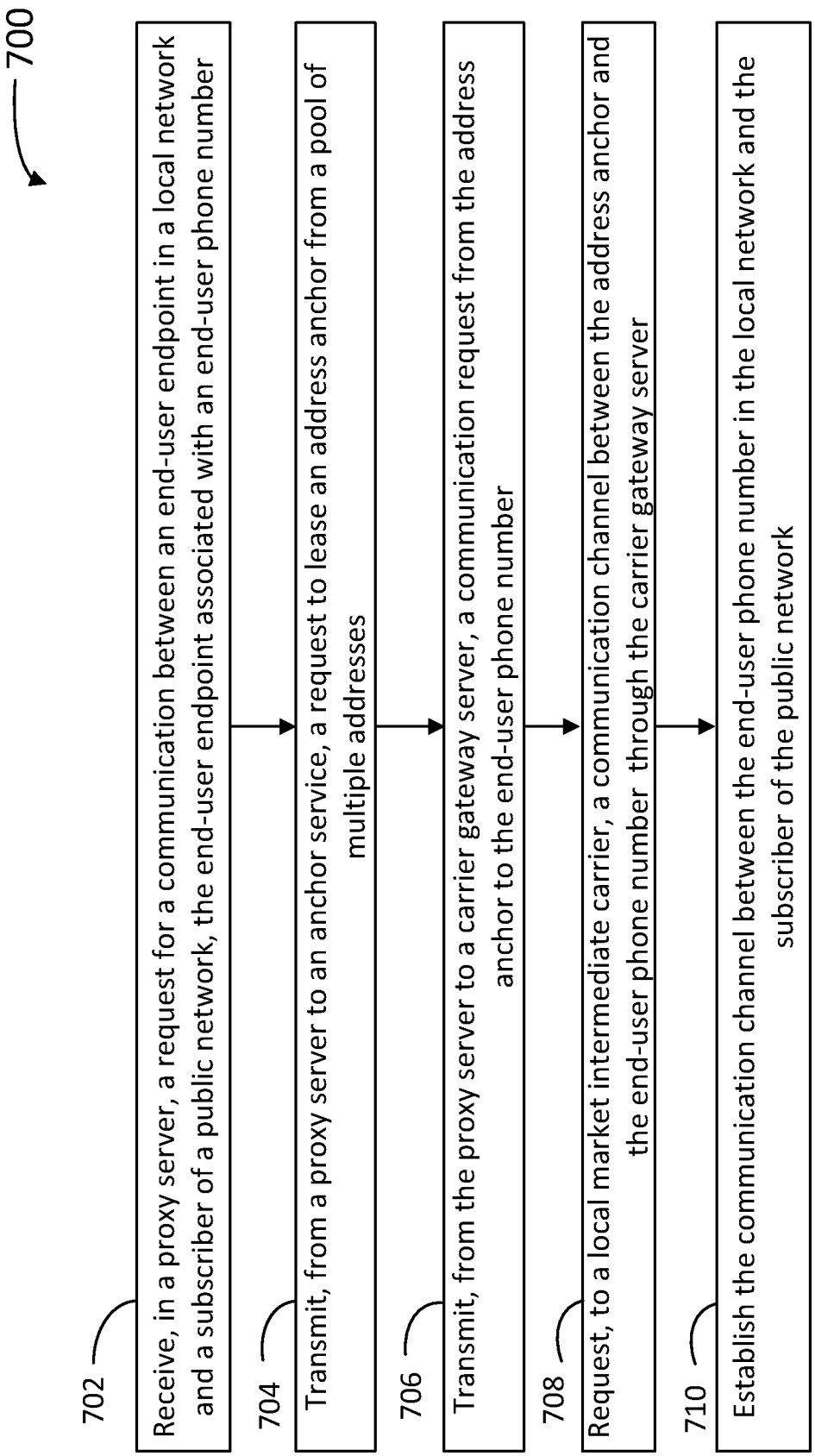
FIG. 7 is a flowchart illustrating steps in a method for managing outbound calls from an international market using a direct inward dialing pool, according to some embodiments.

FIG. 7 is a flowchart illustrating steps in a method 700 for managing outbound calls from an international market using a direct inward dialing pool, according to some embodiments. Method 700 may be performed at least partially by any one of the network servers hosting a bridging engine (e.g., bridging engine 240), while communicating with any one of a plurality of client devices in a unified communication platform (e.g., servers 130 and clients 110 in unified communication platforms 10, 20, 30, 40, and 50). The unified communication platform may include an international market and a local market (e.g., local market 450-2 and global market 450-1). The local market may include a local network serviced by the unified communication platform and a public network that may be outside the unified communication platform, and serviced by a local market intermediate carrier (e.g., customer site 311-1 and SIP gateway server 430-5, PSTN 311-2, and intermediate carrier 411-2). In some embodiments, the server may include a proxy server or a carrier gateway server, including a universal carrier proxy tool (e.g., universal carrier proxy tool 242). The bridging engine may also include a DID tool, a private exchange tool, or both (e.g., DID tool 244 and PBX tool 246). At least some of the steps in method 700 may be performed by a computer having a processor executing commands stored in a memory of the computer (e.g., processors 212 and 236, memories 220 and 232). For example, at least some of the commands may be included in an application installed in a client device accessible by a user (e.g., application 222). Further, steps as disclosed in method 700 may include retrieving, editing, and/or storing information in a pool of multiple addresses that is part of, or is communicably coupled to, the computer (e.g., address anchor pool 252). For example, the address anchor pool may include multiple phone numbers for bridging a third party call with a DID number (e.g., address anchor) within the unified communication platform. Methods consistent with the present disclosure may include at least some, but not all, of the steps illustrated in method 700, performed in a different sequence. Furthermore, methods consistent with the present disclosure may include at least two or more steps as in method 700 performed overlapping in time, or almost simultaneously.

Step 702 includes receiving, in the proxy server, a request for a communication between an end-user endpoint in the local network and a subscriber of the public network. In some embodiments, the proxy server knows that a "from" address in the request for communication contains the DID (phone number) assigned to the end-user. In some embodiments, step 702 includes determining that the local market intermediate carrier is not a client of the proxy server.

Step 704 includes transmitting, from the proxy server to the anchor service, a request to lease an address anchor from the pool of multiple addresses. In some embodiments, step 704 includes transmitting, from the anchor service to the proxy server, the address anchor as an originating address and an end-user phone number as a terminating address. In some embodiments, step 704 includes creating a lease record in a database, the lease record including a date and time of lease, the anchor address, a destination phone number of the subscriber of the public network, a phone number of the end-user endpoint, and a direction of the communication.

Step 706 includes transmitting, from the proxy server to the carrier gateway server, a communication request from the address anchor to the end-user phone number.

Step 708 includes requesting, to the local market intermediate carrier, a communication channel between the address anchor and the end-user phone number through the carrier gateway server.

Step 710 includes establishing the communication between the end-user phone number in the local network and the subscriber of the public network. In some embodiments, step 710 includes releasing the lease for the address anchor when the communication channel is established. In some embodiments, step 710 includes identifying whether the request for a communication is a request for an outbound call when the end-user phone number is a phone number in the pool of multiple addresses.

Hardware Overview

Figure 8:
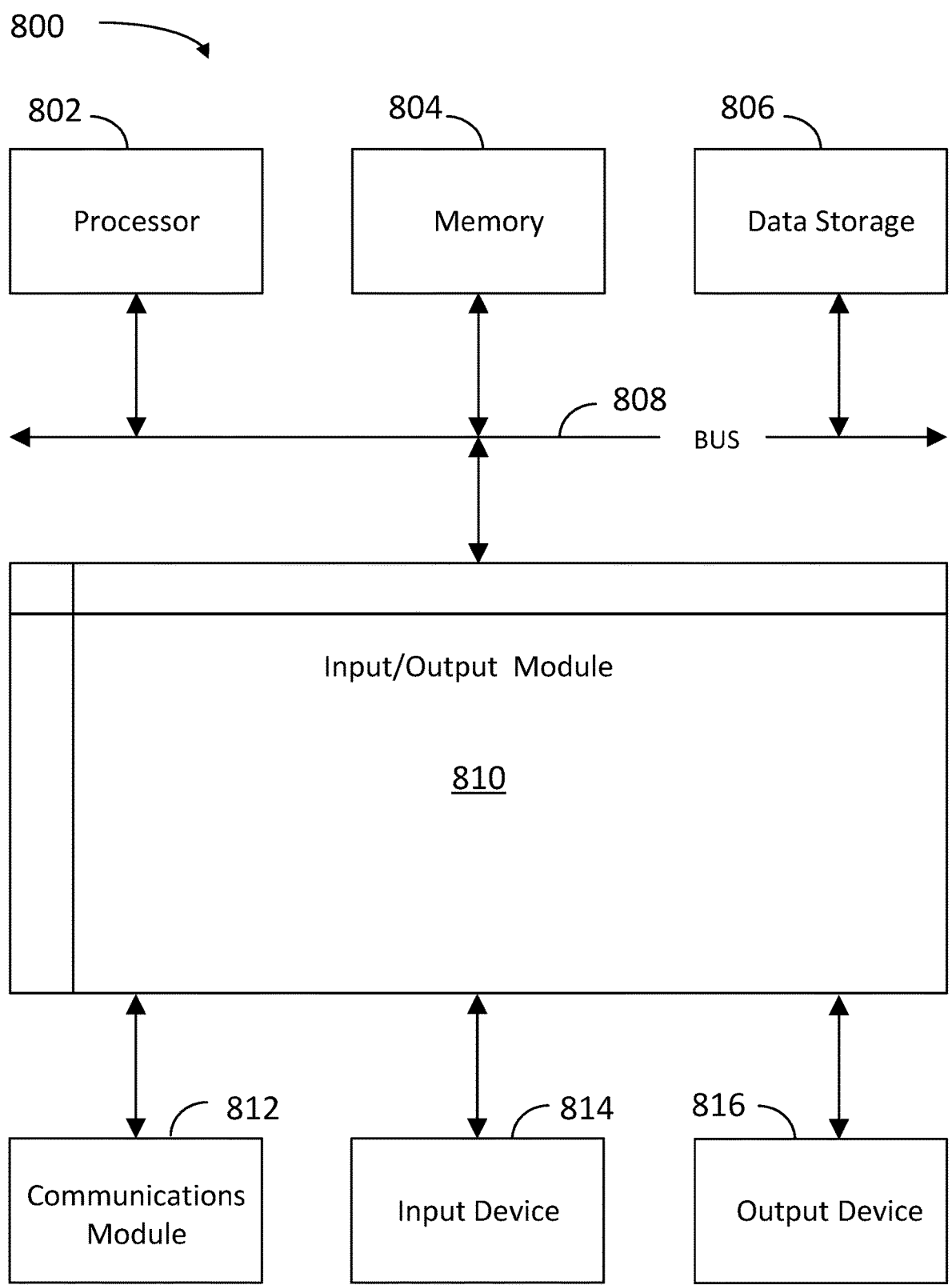
FIG. 8 is a block diagram illustrating an example computer system with which the client and server of FIGS. 1-3, and the methods of FIGS. 6 and 7 can be implemented, according to some embodiments.

FIG. 8 is a block diagram illustrating an exemplary computer system 800 with which the client device 110 and server 130 of FIGS. 1-3, and the methods of FIGS. 6 and 7 can be implemented. In certain aspects, the computer system 800 may be implemented using hardware or a combination of software and hardware, either in a dedicated server, or integrated into another entity, or distributed across multiple entities.

Computer system 800 (e.g., client device 110 and server 130) includes a bus 808 or other communication mechanism for communicating information, and a processor 802 (e.g., processors 212 and 236) coupled with bus 808 for processing information. By way of example, the computer system 800 may be implemented with one or more processors 802. Processor 802 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 800 can include, in addition to hardware, a code that creates an execution environment for the computer program in question, e.g., code that constitutes processor firmware, a protocol stack, a database management system, an operating system, or a combination of one or more of them stored in an included memory 804 (e.g., memories 220 and 232), such as a Random Access Memory (RAM), a flash memory, a Read-Only Memory (ROM), a Programmable Read-Only Memory (PROM), an Erasable PROM (EPROM), registers, a hard disk, a removable disk, a CD-ROM, a DVD, or any other suitable storage device, coupled to bus 808 for storing information and instructions to be executed by processor 802. The processor 802 and the memory 804 can be supplemented by, or incorporated in, a special purpose logic circuitry.

The instructions may be stored in the memory 804 and implemented in one or more computer program products, i.e., one or more modules of computer program instructions encoded on a computer-readable medium for execution by, or to control the operation of, the computer system 800, and according to any method well-known to those skilled in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 804 may also be used for storing temporary variable or other intermediate information during execution of instructions to be executed by processor 802.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 800 further includes a data storage device 806 such as a magnetic disk or optical disk, coupled to bus 808 for storing information and instructions. Computer system 800 may be coupled via input/output module 810 to various devices. Input/output module 810 can be any input/output module. Exemplary input/output modules 810 include data ports such as USB ports. The input/output module 810 is configured to connect to a communications module 812. Exemplary communications modules 812 (e.g., communications modules 218-1 and 218-2) include networking interface cards, such as Ethernet cards and modems. In certain aspects, input/output module 810 is configured to connect to a plurality of devices, such as an input device 814 (e.g., input device 214) and/or an output device 816 (e.g., output device 216). Exemplary input devices 814 include a keyboard and a pointing device, e.g., a mouse or a trackball, by which a user can provide input to the computer system 800. Other kinds of input devices 814 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Exemplary output devices 816 include display devices, such as an LCD (liquid crystal display) monitor, for displaying information to the user.

According to one aspect of the present disclosure, the client device 110 and server 130 can be implemented using a computer system 800 in response to processor 802 executing one or more sequences of one or more instructions contained in memory 804. Such instructions may be read into memory 804 from another machine-readable medium, such as data storage device 806. Execution of the sequences of instructions contained in main memory 804 causes processor 802 to perform the process steps described herein. One or more processors in a multi-processing arrangement may also be employed to execute the sequences of instructions contained in memory 804. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. The communication network (e.g., network 150) can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 800 can include clients and servers. A client and server are generally remote from each other and typically interact through a communication network. The relationship of client and server arises by virtue of computer programs running on the respective computers and having a client-server relationship with each other. Computer system 800 can be, for example, and without limitation, a desktop computer, laptop computer, or tablet computer. Computer system 800 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer-readable medium" as used herein refers to any medium or media that participates in providing instructions to processor 802 for execution. Such a medium may take many forms, including, but not limited to, non-volatile media, volatile media, and transmission media. Non-volatile media include, for example, optical or magnetic disks, such as data storage device 806. Volatile media include dynamic memory, such as memory 804. Transmission media include coaxial cables, copper wire, and fiber optics, including the wires that include bus 808. Common forms of machine-readable media include, for example, floppy disk, flexible disk, hard disk, magnetic tape, any other magnetic medium, CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the term "include," "have," or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A computer-implemented method comprising:
    receiving, in a proxy server, a request for a communication between an end-user endpoint in a local network and a subscriber of a public network, wherein the end-user endpoint is associated with an end-user phone number;
    transmitting, from a proxy server to an anchor service, a request to lease an address anchor from a pool of multiple addresses;
    transmitting, from the proxy server to a carrier gateway server, a communication request from the address anchor to the end-user phone number;
    requesting, to a local market intermediate carrier, a communication channel between the address anchor and the end-user phone number through the carrier gateway server; and
    establishing the communication between the end-user phone number in the local network and the subscriber of the public network, wherein transmitting, from the proxy server to an anchor service, a request to lease an address anchor from a pool of multiple addresses, comprises creating a lease record in a database, the lease record including a date and time of lease, the anchor address, a destination phone number of the subscriber of the public network, the end-user phone number, and a direction of the communication.

2. The computer-implemented method of claim 1, wherein receiving, in the proxy server, a request for a communication between an end-user phone number in a local network and a subscriber of a public network comprises determining that the local market intermediate carrier is not a client of the proxy server.

3. The computer-implemented method of claim 1, wherein transmitting, from the proxy server to a carrier gateway server, a communication request from the address anchor to the end-user endpoint, comprises transmitting, from the anchor service to the proxy server, the address anchor as an originating address and the end-user phone number as a terminating address.

4. The computer-implemented method of claim 1, further comprising releasing the lease for the address anchor when the communication channel is established.

5. The computer-implemented method of claim 1, further comprising identifying whether the request for a communication is a request for an outbound call when the end-user phone number is a phone number in the pool of multiple addresses.

6. The computer-implemented method of claim 1, further comprising verifying, with a cleanup service, that a lease that is created is released after a configurable threshold.

7. The computer-implemented method of claim 1, further comprising monitoring for a fault when a lease is not released after a configurable threshold; and issuing an alert when a number of faults exceeds a pre-selected value.

8. The computer-implemented method of claim 1, further comprising identifying whether the request for communication is for an inbound communication channel or an outbound communication channel.

9. The computer-implemented method of claim 1, further comprising selecting the address anchor from the pool of multiple addresses from a nearby market based on a latency and a reliability of the address anchor.

10. A system, comprising:
    one or more processors; and
    a memory coupled to the one or more processors, the memory including instructions that, when executed by the one or more processors, cause the one or more processors to:
    receive, in a proxy server, a request for a communication between an end-user endpoint in a local network and a subscriber of a public network, wherein the end-user endpoint is associated with an end-user phone number;
    transmit, from a proxy server to an anchor service, a request to lease an address anchor from a pool of multiple addresses;
    transmit, from the proxy server to a carrier gateway server, a communication request from the address anchor to the end-user phone number;
    request, to a local market intermediate carrier, a communication channel between the address anchor and the end-user phone number through the carrier gateway server; and
    establish the communication between the end-user phone number in the local network and the subscriber of the public network, wherein to transmit, from the proxy server to an anchor service, a request to lease an address anchor from a pool of multiple addresses, the one or more processors execute instructions to create a lease record in a database, the lease record including a date and time of lease, the anchor address, a destination phone number of the subscriber of the public network, the end-user phone number, and a direction of the communication.

11. The system of claim 10, wherein to receive, in the proxy server, a request for a communication between an end-user phone number in a local network and a subscriber of a public network, the one or more processors execute instructions to determine that the local market intermediate carrier is not a client of the proxy server.

12. The system of claim 10, wherein to transmit, from the proxy server to a carrier gateway server, a communication request from the address anchor to the end-user endpoint, the one or more processors transmitting, from the anchor service to the proxy server, the address anchor as an originating address and the end-user phone number as a terminating address.

13. The system of claim 10, wherein the one or more processors further execute instructions to release the lease for the address anchor when the communication channel is established.

14. The system of claim 10, wherein the one or more processors further execute instructions to identify whether the request for a communication is a request for an outbound call when the end-user phone number is a phone number in the pool of multiple addresses.

15. The system of claim 10, further comprising a cleanup daemon storing instructions, which cause the one or more processors to verify, with a cleanup service, that a lease that is created is released after a configurable threshold.

16. The system of claim 10, wherein the one or more processors further execute instructions to monitor for a fault when a lease is not released after a configurable threshold; and to issue an alert when a number of faults exceeds a pre-selected value.

17. The system of claim 10, wherein the one or more processors further execute instructions to identify whether the request for communication is for an inbound communication channel or an outbound communication channel.

18. The system of claim 10, wherein the one or more processors further execute instructions to select the address anchor from the pool of multiple addresses from a nearby market based on a latency and a reliability of the address anchor.

* * * * *